(12) United States Patent
Black

(10) Patent No.: US 12,318,700 B2
(45) Date of Patent: Jun. 3, 2025

(54) METHOD AND SYSTEM FOR PROVIDING NAVIGATION ASSISTANCE IN THREE-DIMENSIONAL VIRTUAL ENVIRONMENTS

(71) Applicant: TMRW Group IP, Pasteur (LU)

(72) Inventor: Robert Harry Black, Hoylake Wirral (GB)

(73) Assignee: TMRW Group IP, Luxembourg (LU)

( * ) Notice: Subject to any disclaimer, the term of this patent is extended or adjusted under 35 U.S.C. 154(b) by 337 days.

(21) Appl. No.: 17/829,314

(22) Filed: May 31, 2022

(65) Prior Publication Data

US 2023/0381670 A1 Nov. 30, 2023

(51) Int. Cl.
*A63F 13/825* (2014.01)
*A63F 13/5255* (2014.01)

(52) U.S. Cl.
CPC ........ *A63F 13/825* (2014.09); *A63F 13/5255* (2014.09)

(58) Field of Classification Search
CPC .............. A63F 13/5252; A63F 13/5258; A63F 13/5255; A63F 13/825
See application file for complete search history.

(56) References Cited

U.S. PATENT DOCUMENTS

2020/0289934 A1* 9/2020 Azmandian ............. G06F 3/012
2021/0275930 A1* 9/2021 Oka ...................... A63F 13/837

FOREIGN PATENT DOCUMENTS

WO 2003058518 A2 7/2003
WO 2003058518 A3 7/2003

OTHER PUBLICATIONS

Le Duc Anh et al., "Enhancing the Experience of Virtual Conferences in Social Virtual Environments," 2020 IEEE Conference on Virtual Reality and 3D User Interface Abstracts and Workshop (VRW), IEEE Mar. 22, 2020, p. 485-494, XP033770167.

* cited by examiner

*Primary Examiner* — James S. McClellan
(74) *Attorney, Agent, or Firm* — BRYAN CAVE LEIGHTON PAISNER LLP

(57) ABSTRACT

A method for providing navigation assistance in a three-dimensional (3D) virtual environment includes a plurality of virtual characters corresponding to a plurality of users, wherein the plurality of virtual characters communicates with each other in the 3D virtual environment and a plurality of virtual cameras corresponding to the plurality of virtual characters. Further, the given virtual camera being movable according to a movement of the corresponding virtual character. Further, providing at least one predefined navigation path in the 3D virtual environment for directing the plurality of virtual characters to move towards at least one virtual area in the 3D virtual environment. Furthermore, providing an indication of scene details in the at least one virtual area. Moreover, capturing a plurality of video streams using the plurality of virtual cameras and sending the plurality of video streams to the plurality of user devices for display thereat.

20 Claims, 8 Drawing Sheets

```
                                                    ╱100
                                                   ╱

┌─────────────────────────────────────────────────────────────┐
│  ACCESSING 3D VIRTUAL ENVIRONMENT USING PLURALITY OF USER   │
│     DEVICES THAT ARE ASSOCIATED WITH PLURALITY OF USERS     │
│                            102                               │
│  ┌───────────────────────────────────────────────────────┐  │
│  │  3D VIRTUAL ENVIRONMENT INCLUDES PLURALITY OF VIRTUAL │  │
│  │    CHARACTERS CORRESPONDING TO PLURALITY OF USERS,    │  │
│  │   PLURALITY OF VIRTUAL CHARACTERS BEING ARRANGED AT   │  │
│  │  DIFFERENT VIRTUAL POSITIONS THAT CHANGE DYNAMICALLY  │  │
│  │   AS PLURALITY OF VIRTUAL CHARACTERS NAVIGATE         │  │
│  │   THROUGH 3D VIRTUAL ENVIRONMENT, PLURALITY OF        │  │
│  │   VIRTUAL CHARACTERS COMMUNICATE WITH EACH OTHER      │  │
│  │              IN 3D VIRTUAL ENVIRONMENT                │  │
│  │                         102A                          │  │
│  └───────────────────────────────────────────────────────┘  │
│  ┌───────────────────────────────────────────────────────┐  │
│  │  PLURALITY OF VIRTUAL CAMERAS CORRESPONDING TO        │  │
│  │  PLURALITY OF VIRTUAL CHARACTERS, GIVEN VIRTUAL       │  │
│  │  CAMERA IS POSITIONED AT GIVEN DISTANCE FROM          │  │
│  │  CORRESPONDING VIRTUAL CHARACTER AND VIEWS 3D         │  │
│  │  VIRTUAL ENVIRONMENT FROM GIVEN ORIENTATION, GIVEN    │  │
│  │  VIRTUAL CAMERA BEING MOVABLE ACCORDING TO            │  │
│  │      MOVEMENT OF CORRESPONDING VIRTUAL CHARACTER      │  │
│  │                         102B                          │  │
│  └───────────────────────────────────────────────────────┘  │
└─────────────────────────────────────────────────────────────┘
                              │
                              ▼
┌─────────────────────────────────────────────────────────────┐
│   AT ANY GIVEN TIME, DIFFERENT VIRTUAL POSITIONS OF          │
│   PLURALITY OF VIRTUAL CHARACTERS FORMS GEOMETRY,            │
│   GEOMETRY IS ONE OF: CIRCULAR GEOMETRY, OVAL GEOMETRY,      │
│   POLYGONAL GEOMETRY, LINEAR GEOMETRY, ARCUATE               │
│   GEOMETRY, CURVILINEAR GEOMETRY, FREEFORM GEOMETRY.         │
│                            104                               │
└─────────────────────────────────────────────────────────────┘
                              │
                              ▼
┌─────────────────────────────────────────────────────────────┐
│   GIVEN VIRTUAL CAMERA IS POSITIONED ABOVE HEIGHT OF         │
│          CORRESPONDIG VIRTUAL CHARACTER 106                  │
└─────────────────────────────────────────────────────────────┘
                              │
                              ▼
                            ( A )
```

FIG.1A

METHOD AND SYSTEM FOR PROVIDING NAVIGATION ASSISTANCE IN THREE-DIMENSIONAL VIRTUAL ENVIRONMENTS

TECHNICAL FIELD

The present disclosure relates generally to the field of virtual environments and more specifically, to a method and a system for providing navigation assistance in a three dimensional (3D) virtual environment.

BACKGROUND

With the rapid advancement in innovative technologies, every aspect of life has been changed radically. Recently, with the development of three-dimensional (3D) technologies, for example, a 3D virtual environment has become widespread.

The 3D virtual environment provides new ways to virtually connect as well as communicate with many users at a time. Moreover, the 3D virtual environment may also be used for educational purposes, organizational meetings, video conferencing, as well as for traditional and distance learning. The 3D virtual environment is similar to a physical place, like a meeting room, a classroom, a museum, and the like. The 3D virtual environment is also used for playing video games or for virtual events, for example, video conferencing which is used by users to communicate with each other irrespective of the location of each user participating in the virtual event. A conventional 3D virtual environment, such as used in video games or in the virtual events, is implemented at a massive scale due to which it becomes easy for the users to miss certain details that may be required to provide a holistic experience within the 3D virtual environment. In some scenarios, there may be cutscenes that may provide the users with the experience defined by programmers, but these cutscenes usually prevent or limit the interactions that the users may have. The cutscenes (or event scenes) in case of video games may be defined as a sequence that is not interactive and interrupt the game play. Typically, the cutscenes are used to show the conversations between the character, set the mood, introduce new models and gameplay elements, create emotional connections, and the like. Thus, there exists a technical problem of how to improve user experience in the conventional 3D virtual environment. Therefore, in light of the foregoing discussion, there exists a need to overcome the aforementioned drawbacks associated with the conventional 3D virtual environment.

SUMMARY

The present disclosure provides a method and a system for providing navigation assistance in a three dimensional (3D) virtual environment. The present disclosure provides a solution to the existing problem of how to improve user experience in the conventional 3D virtual environment. An aim of the present disclosure is to provide a solution that overcomes at least partially the problem encountered in the prior art and provides an improved method and a system for providing navigation assistance in a three dimensional (3D) virtual environment.

One or more objectives of the present disclosure are achieved by the solutions provided in the enclosed independent claims. Advantageous implementations of the present disclosure are further defined in the dependent claims.

In an aspect, the present disclosure provides a method for providing navigation assistance in a three-dimensional (3D) virtual environment. The method comprises accessing the 3D virtual environment using a plurality of user devices that are associated with a plurality of users, where the 3D virtual environment comprises a plurality of virtual characters corresponding to the plurality of users, where the plurality of virtual characters are arranged at different virtual positions that change dynamically as the plurality of virtual characters navigate through the 3D virtual environment, and where the plurality of virtual characters communicate with each other in the 3D virtual environment. The 3D virtual environment further comprises a plurality of virtual cameras corresponding to the plurality of virtual characters, where a given virtual camera is positioned at a given distance from a corresponding virtual character and views the 3D virtual environment from a given orientation, where the given virtual camera is movable according to a movement of the corresponding virtual character. The method further comprises providing at least one predefined navigation path in the 3D virtual environment for directing the plurality of virtual characters to move towards at least one virtual area in the 3D virtual environment, where the at least one predefined navigation path is divided into a plurality of sub-paths at the at least one virtual area. The method further comprises providing an indication of scene details in the at least one virtual area when at least one of the plurality of virtual characters are present at or in proximity of the at least one virtual area. The method further comprises capturing a plurality of video streams using the plurality of virtual cameras, a given video stream is captured from a perspective of a given virtual camera that is associated with a given virtual character, where the given video stream represents at least a region of the 3D virtual environment where at the given virtual character is present and sending the plurality of video streams to the plurality of user devices for display thereat.

The disclosed method provides an enhanced user experience in the 3D virtual environment. The method provides an improved navigation assistance for accessing the 3D virtual environment in such a way that each of the plurality of users does not miss specific details provided in the 3D virtual environment. The predefined navigation path disclosed in the method points out to the at least one virtual area of the 3D virtual environment. Further, the predefined navigation path is divided into the plurality of sub-paths to assist the plurality of users in exploring the at least one virtual area from different directions. Moreover, the formation of the geometry of different shapes by different virtual positions of the plurality of virtual characters provides interactive cinematic experiences and cutscenes which are usually not available in video games or 3D video-conferencing platforms.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application, as well as the functionalities described to be performed by the various entities, are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 1A to 1E collectively is a flow chart of a method for providing navigation assistance in three-dimensional (3D) virtual environment, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1B:
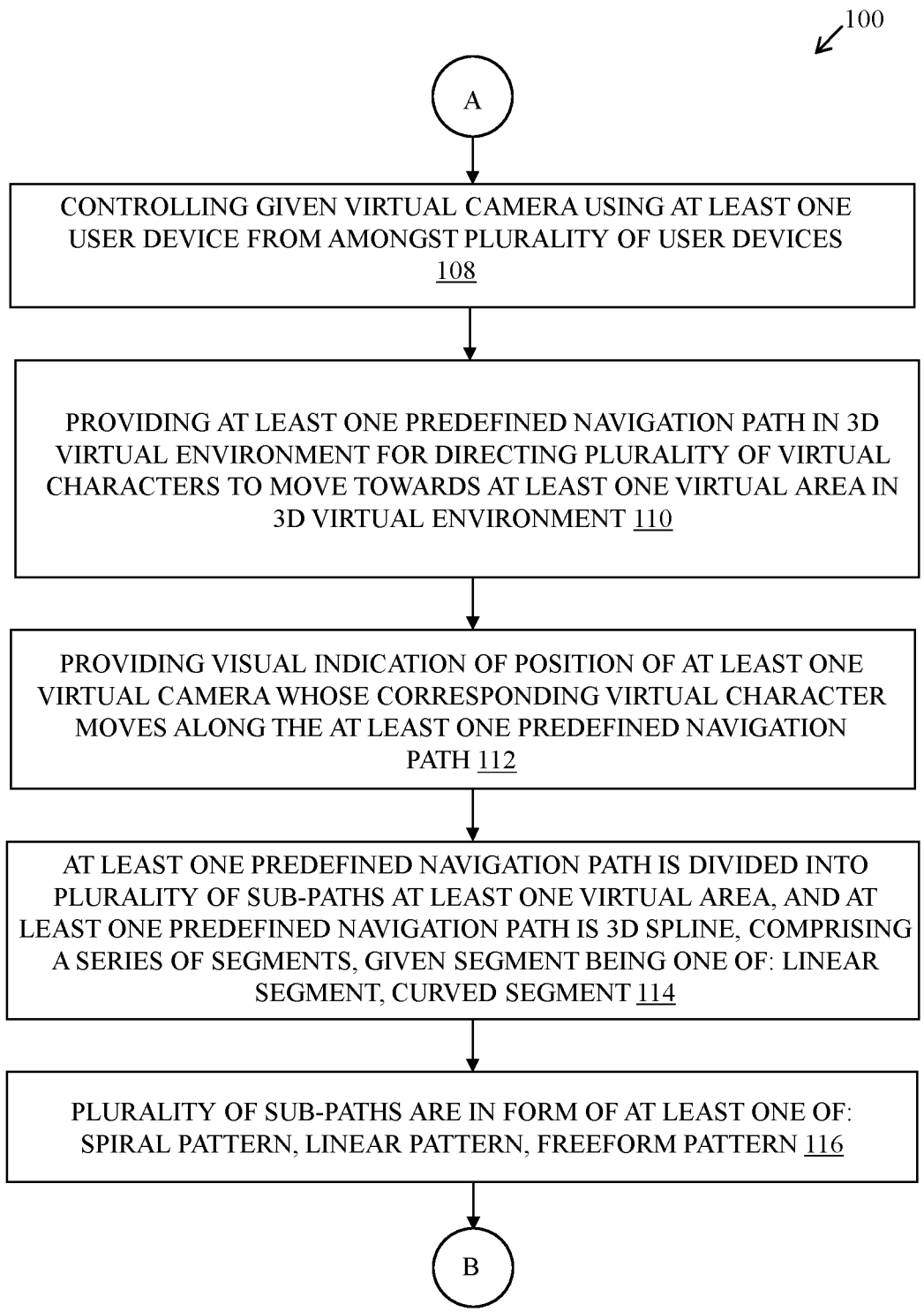
Figure 1C:
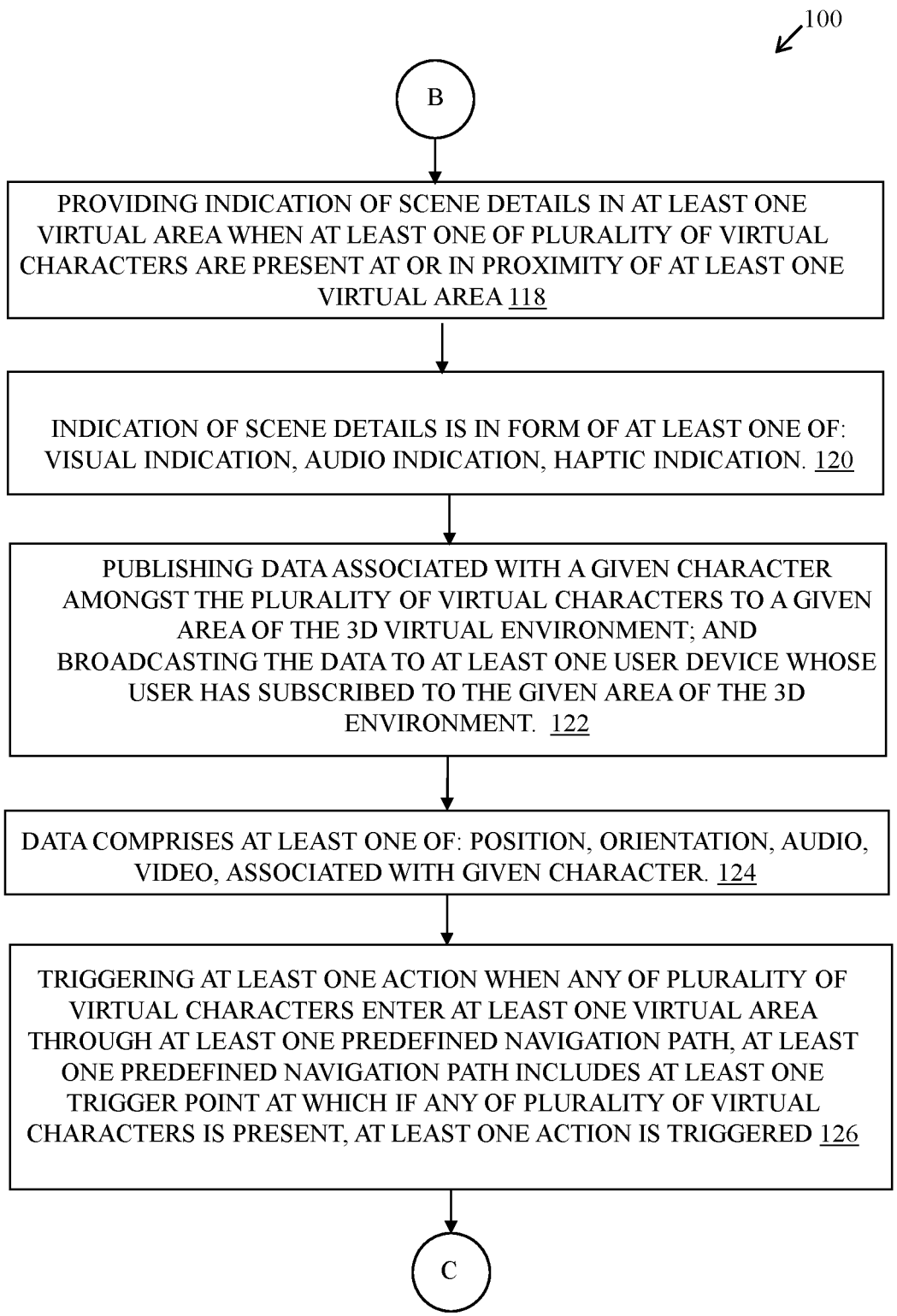
Figure 1D:
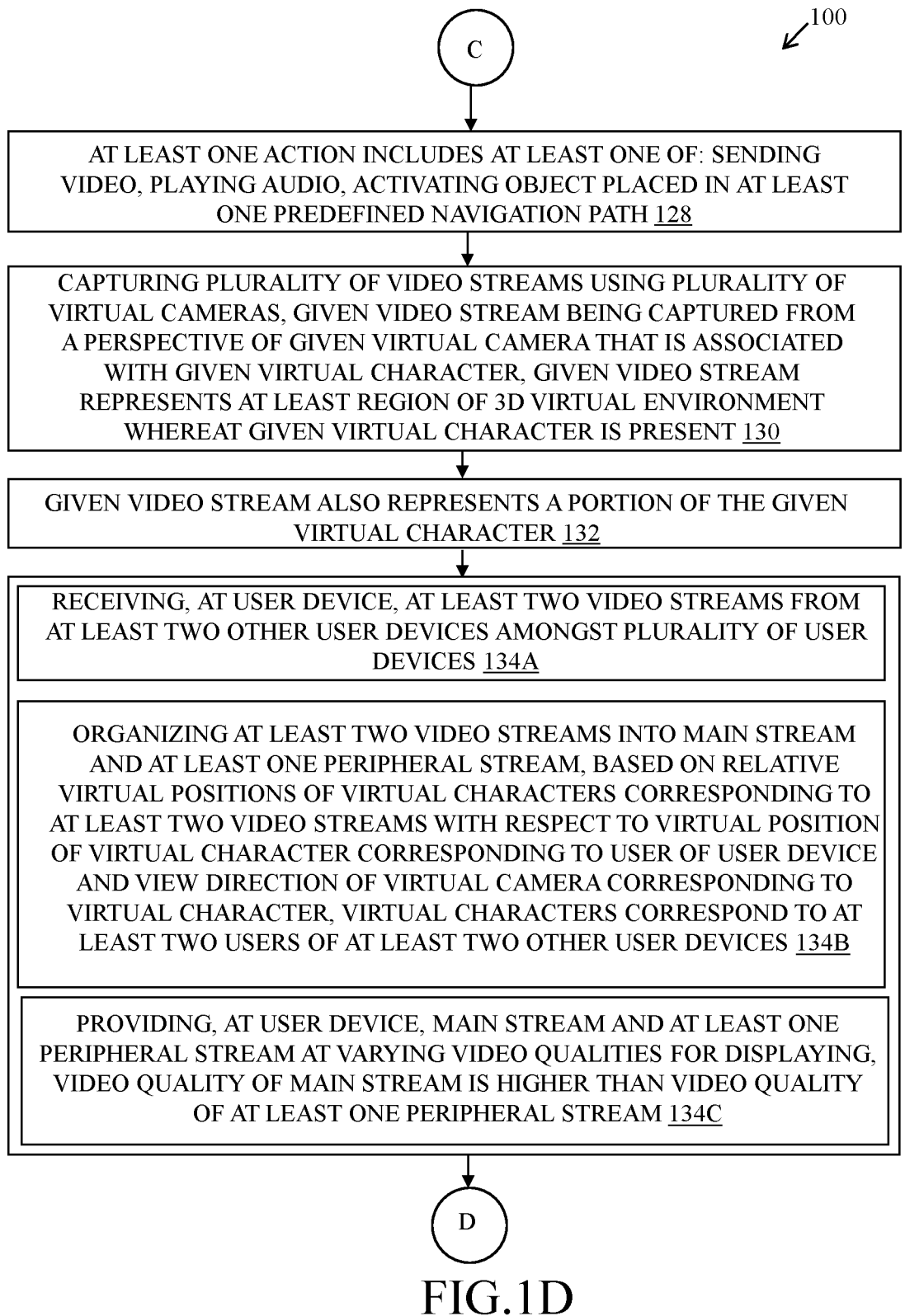
Figure 1E:
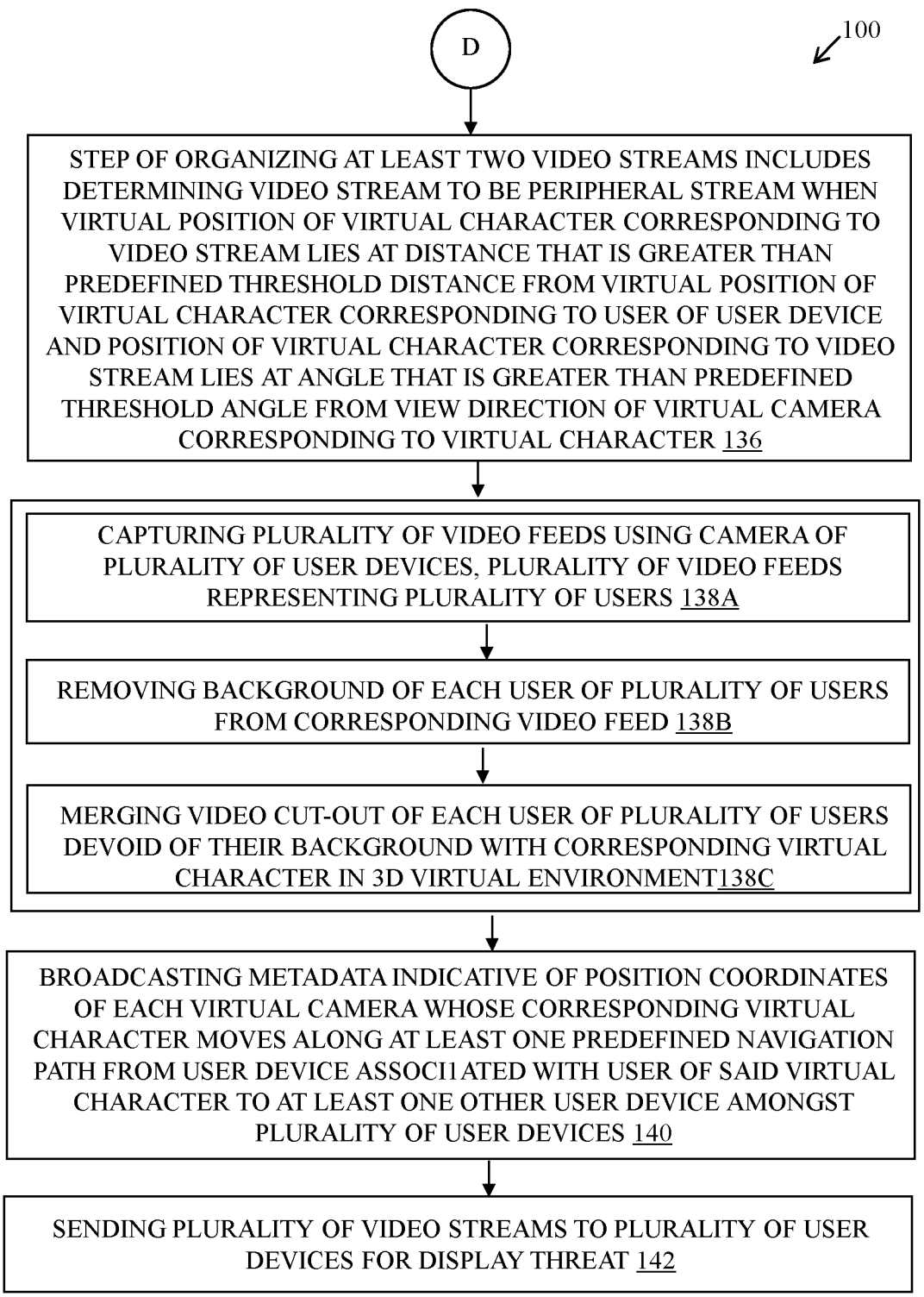

FIGS. 1A to 1E collectively is a flow chart of a method for providing navigation assistance in a three-dimensional (3D) virtual environment, in accordance with an embodiment of the present disclosure. With reference to FIGS. 1A to 1E, there is shown a flowchart of a method 100 that includes steps 102, 104, 106, 108, 110, 112, 114, 116, 118, 120, 122, 124, 126, 128, 130, 132, 134A, 134B, 134C, 136, 138A, 138B, 138C, 140, and 142. The step 102 includes sub steps 102A and 102B. The steps 102 including 102A and 102B, 104 and 106 are shown in FIG. 1A, the steps 108, 110, 112, 114 and 116 are shown in FIG. 1B, the steps 118, 120, 122, 124, 126 are shown in FIG. 1C, the steps 128, 130, 132, 134A, 134B, 134C are shown in FIG. 1D, the steps 136, 138A, 138B, 138C, 140 are shown in FIG. 1E.

There is provided the method 100 for navigation assistance in the 3D virtual environment. The method 100 provides a holistic view in the 3D virtual environment with navigation to indicate each point of interest that helps users to explore each virtual area of the 3D virtual environment. In the method 100, a plurality of virtual characters is controlled by a corresponding plurality of users to explore the 3D virtual environment through a predefined navigation path. The predefined navigation path provides direction so that the plurality of users makes the plurality of virtual characters to move at least one virtual area.

Referring to FIG. 1A, at step 102, the method 100 includes, accessing the 3D virtual environment using a plurality of user devices that are associated with a plurality of users. Each of the plurality of users is configured to access the 3D virtual environment using one of the plurality of user devices. Examples of the plurality of user devices may include, but are not limited to, a smart phone, a laptop, a desktop, a tablet, and the like.

At sub step 102A of the step 102, the 3D virtual environment includes a plurality of virtual characters corresponding to the plurality of users. The plurality of virtual characters is arranged at different virtual positions that change dynamically as the plurality of virtual characters navigate through the 3D virtual environment, the plurality of virtual characters communicating with each other in the 3D virtual environment. Generally, the 3D virtual environment is defined as a computer-simulated electronic 3D virtual environment in which the plurality of users can communicate and interact with each other through the plurality of virtual characters (e.g., avatars). Typically, a virtual character may be defined as an electronic image that either represents a user or may be manipulated by the user. Alternatively stated, the plurality of virtual characters may be defined as graphical representations of the plurality of users. Moreover, the plurality of users can explore the 3D virtual environment by moving the plurality of virtual characters in the 3D virtual environment. As the plurality of users are free to move the plurality of virtual characters in the 3D virtual environment, the position of each of the plurality of virtual characters changes dynamically. In an implementation, the virtual character of each of the plurality of users may be controlled by a head tracking device. In another implementation, the virtual character of each of the plurality of users may be controlled by a mouse movement. In a yet another implementation, the virtual character of each of the plurality of users may be controlled by one or more keyboard keys. Further, the plurality of users communicates with each other in the 3D virtual environment by clicking on a particular virtual character from which the user wants to communicate with other of the plurality of virtual characters. In an implementation, the plurality of virtual characters communicates by sharing an audio. In another implementation, the plurality of virtual characters communicates by sharing a video.

Beneficially, by accessing the 3D virtual environment, the plurality of users communicates with each other on a single platform to explore the whole 3D virtual environment dynamically.

At sub step 102B of the step 102, the 3D virtual environment further includes, a plurality of virtual cameras corresponding to the plurality of virtual characters, where a given virtual camera is positioned at a given distance from a corresponding virtual character and views the 3D virtual environment from a given orientation. Moreover, the given virtual camera is movable according to a movement of the corresponding virtual character. Further, the plurality of virtual cameras corresponding to the plurality of virtual characters captures different views of the 3D virtual environment towards the movement in which the corresponding virtual character is moved. In an implementation, the given virtual camera is positioned at the given distance from the corresponding virtual character. The given distance may either be fixed or set by the user associated with the corresponding virtual character. Moreover, the given virtual camera captures different views of the 3D virtual environment from the given orientation which may either be fixed or varied by the user associated with the corresponding virtual character. For example, a first user controls a first virtual character, and a first virtual camera that corresponds to the first virtual character, then the particular virtual area viewed by the first virtual character is captured by the first virtual camera. Further, the view captured by the first virtual camera is viewed by the first user.

At step 104, at any given time, the different virtual positions of the plurality of virtual characters forms a geometry, the geometry being one of: a circular geometry, an oval geometry, a polygonal geometry, a linear geometry, an arcuate geometry, a curvilinear geometry, or a freeform geometry. The geometry formed by the plurality of virtual characters may be arranged around a virtual structure of the virtual environment, such as a table, one or more couches, a bonfire, seats of an auditorium or classroom, and the like. In an implementation, the different virtual positions of the plurality of virtual characters provides a realistic view of the 3D virtual environment in which each of the plurality of users able to see each other in one sight of view. In another implementation, the different virtual positions of the plurality of virtual characters provides a hassle-free way to communicate with each other as each user does not require to search for another user because the plurality of virtual characters corresponding to the plurality of users are at one place forming one of the circular geometry, the oval geometry, the polygonal geometry, the linear geometry, the arcuate geometry, the curvilinear geometry, the freeform geometry, and the like.

At step 106, the method 100 includes the given virtual camera being positioned above a height of the corresponding virtual character. In an implementation, the given virtual camera is positioned above the height of the corresponding virtual character as well as behind the corresponding virtual character so that the user from the plurality of users can view scenes in the 3D virtual environment and also, the head and torso of the corresponding virtual character. Further, the view of the head and torso of the corresponding virtual character enables the user to analyse the movement of the corresponding virtual character. In another implementation, the given virtual camera is positioned above the height of the corresponding virtual character as well as in front of the corresponding virtual character so that the user associated with the corresponding virtual character receives a line-of-sight view of the corresponding virtual character.

Now referring to FIG. 1B, at step 108, the method 100 includes controlling the given virtual camera using at least one user device from amongst the plurality of user devices. For example, if the first user is using the first user device to control the first virtual character, then the at least one virtual area in the 3D virtual environment covered by the first virtual character is viewed by the first user. The reason being the first virtual camera corresponding to the first virtual character captures the view with respect to the at least one virtual area viewed by the first virtual character.

At step 110, the method 100 includes providing at least one predefined navigation path in the 3D virtual environment for directing the plurality of virtual characters to move towards at least one virtual area in the 3D virtual environment. Further, the at least one predefined navigation path includes a common starting point. Furthermore, the at least one predefined navigation path enables the plurality of users to move their corresponding plurality of virtual characters to one or more virtual areas in the 3D virtual environment. Furthermore, the at least one predefined navigation path also guides the plurality of users in exploring different virtual areas of the 3D virtual environment so that the plurality of users does not miss specific details provided in the 3D virtual environment.

At step 112, the method 100 includes providing a visual indication of a position of at least one virtual camera whose corresponding virtual character moves along the at least one predefined navigation path. For example, if the first user and the second user from the plurality of users explores the 3D virtual environment through the first virtual character and the second virtual character, then the first user can see the position of the virtual camera located on (e.g., height) the second virtual character. The virtual camera located on the second virtual character is viewed by the first user from the plurality of users through the visual indication. Examples of the visual indication may include, but are not limited to, a dot, an orb, a virtual object, a halo, a virtual fog, and the like.

At step 114, the at least one predefined navigation path is divided into a plurality of sub-paths at the at least one virtual area, and the at least one predefined navigation path is a 3D spline, the 3D spline comprising a series of segments, a given segment being one of a linear segment, a curved segment. The at least one predefined navigation path varies according to the 3D virtual environment, such as at least one predefined navigation path is divided into the plurality of sub-paths that enables the plurality of users to experience a holistic view of the one or more virtual areas from different directions. Moreover, the plurality of sub-paths may have different patterns. In an example, depending on an implementation scenario of the 3D virtual environment, the predefined navigation path may be one or more in number. In an implementation, the at least one predefined navigation path may be the 3D spline, whereas the 3D spline comprises the series of segments and the given segment is one of the linear segment and the curved segment. Examples of the curved segment may include, but are not limited to, a Bezier segment, a Hermite segment, and the like.

At step 116, the plurality of sub-paths are in form of at least one of: a spiral pattern, a linear pattern, or a freeform pattern. In an implementation, the spiral pattern is obtained by the sub-paths of the at least one predefined navigation path to provide a 360-degree view to the plurality of users. In another implementation, the linear pattern is obtained by the sub-paths of the at least one predefined navigation path to provide a straight view to the plurality of users. In a yet another implementation, the freeform pattern is obtained by the sub-paths of the at least one predefined navigation path to allow the plurality of user to move freely in the particular virtual area.

Now referring to FIG. 1C, at step 118, the method 100 includes providing an indication of scene details in the at least one virtual area when at least one of the plurality of virtual characters are present at or in proximity of the at least one virtual area. For example, in a case, three virtual characters from the plurality of virtual characters are moving on the at least one pre-defined navigation path towards the at least one virtual area in the 3D virtual environment. The indication of scene details is provided as soon as even one of the three virtual characters approaches the at least one virtual area or reaches the at least one virtual area, so as to provide an enhanced viewing experience to the virtual character moving towards the at least one virtual area. Thus, the indication of the scene details is provided to the virtual character that approaches or reaches the at least one virtual area or can also be provided to the plurality of virtual characters. In an implementation, the indication of the scene details in the at least one virtual area may be provided by blinking of a particular virtual area from the at least one virtual area. In another implementation, the indication of the scene details in the at least one virtual area may be provided by highlighting of the particular virtual area from the at least one virtual area. In a yet another implementation, the indication of the scene details in the at least one virtual area may be provided by playing an audio or a video in the particular virtual area from the at least one virtual area when any of the virtual character from the plurality of virtual characters enters in the proximity of the at least one virtual area. The indication of scene details in the at least one virtual area supports to drive an attention of each user from the plurality of users. In an implementation, the plurality of users interacts within the at least one virtual area by clicking in the particular area from the at least one virtual area. In another implementation, the plurality of users interacts within the at least one virtual area by entering in the particular area from the at least one virtual area. In an example, the plurality of users interacts within the at least one virtual area by sending a voice command in the particular area from the at least one virtual area. In another example, the plurality of users interacts within the at least one virtual area by providing a gesture command in the particular area from the at least one virtual area.

At step 120, the indication of the scene details is in form of at least one of a visual indication, an audio indication, a haptic indication. In an example, if the first user from the plurality of users enters in the proximity of the at least one virtual area then the video indication is provided to the first user in order to grab the attention of the first user towards the at least one virtual area. Examples of the visual indication includes, but not limited to, playing of a video, playing of a graphic interchange format (GIF) image, playing of an animated video, and the like. In another example, if the first user from the plurality of users enters in the proximity of the at least one virtual area then the audio indication is played to grab the attention of the first user towards the at least one virtual area. Examples of the audio indication includes, but not limited to, playing of a ringtone, playing of a voice record, and the like. In a yet another example, if the first user from the plurality of users enters in the proximity of the at least one virtual area then the haptic indication is provided to the first user in order to interact the first user with the at least one virtual area. Examples of the haptic indication includes, but not limited to, a clicking or moving in the at least one virtual area.

At step 122, the method 100 includes publishing data associated with a given character amongst the plurality of virtual characters to a given area of the 3D virtual environment and broadcasting the data to at least one user device whose user has subscribed to the given area of the 3D environment. The publishing and broadcasting of the data is used as a communication model between the plurality of users in the 3D virtual environment. The data (e.g., position, audio, video, and the like) associated with the given virtual character is published amongst the plurality of virtual characters to the given area (or a specific area) of the 3D virtual environment. And, the users who want to view and listen to the published data, subscribe the given area of the 3D virtual environment and therefore, data is broadcasted to those user devices whose users have subscribed the given area of the 3D virtual environment. For example, the first user publishes the data (i.e., position, audio, video, and the like) through the corresponding first user device in a first virtual area of the 3D virtual environment. Further, the published data is restricted to the first virtual area only. In an implementation, if the second user requires to access the data published by the first user in the first virtual area, then the second user requires to subscribe the first virtual area of the 3D virtual environment. After subscription of the first virtual area, the published data is broadcasted to the second user device operated by the second user. In another implementation, if the second user requires to access the data published by the first user in the first virtual area, then the second user requires to move the corresponding second virtual character to the first virtual area to access the published data of the first user. Beneficially, the plurality of users receives the published data of each other by subscribing to the virtual area in which the data is published.

In an implementation, the data associated with the given virtual character is published through a publish-subscribe module that is further used by the users who have subscribed the given area of the 3D virtual environment. The publish-subscribe module is used by a processor to restrict the access of the data for other user devices from the plurality of user devices who have not subscribed the given area of the 3D virtual environment. In an example, the publish-subscribe module is used as a communications model where data (e.g., position, audio, and video) of a user, such as the first user is published to a specific virtual area of the 3D virtual environment and another user who want to view and listen to it, subscribe to the particular virtual area of the 3D virtual environment. The publish-subscribe module corresponds to a model of communication-based on the production and consumption of content in which the communication through the publish-subscribe model may be enabled to be anonymous, meaning that the server and/or each of the plurality of user devices do not require to know about subscription to obtain the resources of the virtual environment. Typical the publish-subscribe module enables information exchange to which each participant can publish and receive information, enabling greater degrees of flexibility than typical client-server models. The publish-subscribe module of the current disclosure enables dynamically concentrating a greater number of resources to each of the plurality of user devices that require them the most, such as to higher-resource demanding cells where a user device can subscribe. Also, as the number of resources published improves the amount of the 3D virtual environment, and the level of interactions within the portion of the 3D virtual environment visible to each user.

At step 124, the data includes at least one of a position, an orientation, an audio, a video, associated with the given character. The data associated with the given character includes one of the position, the orientation, the audio and the video which is published amongst the plurality of virtual characters and broadcasted to the user who has subscribed the given area of the 3D virtual environment.

At step 126, the method 100 includes triggering at least one action when any of the plurality of virtual characters enter the at least one virtual area through the at least one predefined navigation path, the at least one predefined navigation path includes at least one trigger point at which if any of the plurality of virtual characters is present, the at least one action is triggered. In a case, if one of the plurality of virtual characters enters the at least one virtual area through the at least one predefined navigation path, then the at least one action gets triggered. The reason being the at least one predefined navigation path includes the at least one trigger point which gets triggered when one of the plurality of virtual characters is present at the at least one trigger point.

Now referring to FIG. 1D, at step 128, the at least one action includes at least one of: sending a video, playing an audio, or activating an object placed in the at least one predefined navigation path. The at least one action which gets triggered when one of the plurality of virtual characters enters the at least one virtual area through the at least one predefined navigation path, that at least one action includes one of the sending the video, playing the audio, and activating the object placed in the at least one predefined navigation path.

At step 130, the method 100 includes, capturing a plurality of video streams using the plurality of virtual cameras, a given video stream being captured from a perspective of a given virtual camera that is associated with a given virtual character, where the given video stream represents at least a region of the 3D virtual environment where at the given virtual character is present. For example, in a case, the first user controls the first virtual character, and the first virtual camera is associated with the first virtual character, then the video stream captured by the first virtual camera represents at least the region of the 3D virtual environment at which the first virtual character is present. Similarly, the plurality of virtual cameras captures the one or more regions of the 3D virtual environment at which the corresponding plurality of virtual characters are present.

At step 132, the given video stream also represents a portion of the given virtual character. For example, if the first user is controlling the first virtual character in the 3D virtual environment, then the portion (e.g., head and torso) of the first virtual character is visible to the first user while exploring the 3D virtual environment. Beneficially, the representation of the portion of the given virtual character enables to track the movement and gestures of the given virtual character. For example, in a case, if the given virtual camera is positioned above the virtual character's head, the given video stream represents the top and back of the head and back of torso of the virtual character. In such a case, the feet of the virtual character may not lie in the perspective of the given virtual camera.

At step 134A, the method 100 includes receiving, at a user device, at least two video streams from at least two other user devices amongst the plurality of user devices. For example, in a case, if three users, such as a first user, a second user and a third user from the plurality of users are using the 3D virtual environment, and the at least one virtual area is explored by the first user and second user then, the video stream of the at least one virtual area explored by the first user and second user is broadcasted to the third user.

At step 134B, the method 100 includes organizing the at least two video streams into a main stream and at least one peripheral stream, based on relative virtual positions of virtual characters corresponding to the at least two video streams with respect to a virtual position of a virtual character corresponding to a user of the user device and a view direction of a virtual camera corresponding to the virtual character, the virtual characters correspond to at least two users of the at least two other user devices. In aforementioned case of the three users, such as the first user, the second user and the third user from the plurality of users using the 3D virtual environment and, the first user explores the at least one virtual area of the 3D virtual environment after entering in the proximity of the particular area and the second user explores the at least one virtual area of the 3D virtual environment without entering in the proximity of the particular area. Furthermore, the video stream captured by the first virtual camera of the first virtual character corresponding to the first user is considered as the main stream. Similarly, the video stream captured by the second virtual camera of the second virtual character corresponding to the second user is considered as the peripheral stream. In this case, the third user receives the video stream from the first user as the main stream and the video stream from the second user as the peripheral stream. Therefore, the captured video stream is organized into the main stream and the at least one peripheral stream, based on the positions and orientations (e.g., orientation of the first virtual camera and the second virtual camera) of the corresponding virtual character (e.g., the first virtual character and the second virtual character). Beneficially, the organization of the received two video streams into the main stream and the peripheral stream provides an enhanced viewing experience to the user (e.g., the third user) of the plurality of users who receives the two video streams.

At step 134C, the method 100 includes providing, at the user device, the main stream and the at least one peripheral stream at varying video qualities for displaying, a video quality of the main stream being higher than a video quality of the at least one peripheral stream. For example, if the first virtual character is positioned within the proximity of the at least one virtual area, then the video stream (i.e., the main stream) captured by the first virtual camera corresponding to the first virtual character is of high quality and high pixel rate. Similarly, the second virtual character is positioned outside the proximity of the at least one virtual area, then the video stream (i.e., the peripheral stream) captured by the second virtual camera corresponding to the second virtual character is of low quality and low pixel rate.

Now referring to FIG. 1E, at step 136, the method 100 includes the step of organizing the at least two video streams, which comprises determining a video stream to be a peripheral stream when a virtual position of a virtual character corresponding to the video stream lies at a distance that is greater than a predefined threshold distance from the virtual position of the virtual character corresponding to the user of the user device, and a position of a virtual character corresponding to the video stream lies at an angle that is greater than a predefined threshold angle from the view direction of the virtual camera corresponding to the virtual character. In one implementation, the predefined threshold distance from the virtual position of the virtual character corresponding to the user that determines the peripheral stream is greater than 0.5 m. In another implementation, the predefined threshold angle from the view direction of the virtual camera corresponding to the virtual character that determines the peripheral stream is greater than 30 degrees. The determination of the video stream as either the main stream or the peripheral stream depends upon the position of the virtual character, and view direction and orientation of the virtual camera of the virtual character from the plurality of virtual characters. For example, if the first virtual character is positioned within the distance of the predefined threshold distance of the at least one virtual area, then the video stream captured by the first virtual camera corresponding to the first virtual character is the main stream. In another situation, if the first virtual character is positioned at a distance greater than the predefined threshold distance of the at least one virtual area, then the video stream captured by the first virtual camera corresponding to the first virtual character is the peripheral stream. Moreover, if the position of the first virtual character lies at the angle greater than the predefined threshold angle from the view direction of the first virtual camera corresponding to the first virtual character, then in such a case, the video stream captured by the first virtual camera is considered as the peripheral stream.

At step 138A, the method 100 includes capturing a plurality of video feeds using cameras of the plurality of user devices, the plurality of video feeds representing the plurality of users. For example, if the first user, the second user and the third user from the plurality of users use the 3D virtual environment through their corresponding user devices, then the cameras of the corresponding user devices capture the video of the respective users. Alternatively stated, the camera of the first user device captures the video of the first user, the camera of the second user device captures the video of the second user and the camera of the third user device captures the video of the third user.

At step 138B, the method 100 includes removing a background of each user of the plurality of users from a corresponding video feed. Further, the video captured by the camera of the user devices is processed to remove the background of the captured video. In an implementation, the background of the captured video may be cropped by a processor. In another implementation, the background of the captured video may be blurred by the processor. In a yet another implementation, the background of the captured video may be changed (e.g., change in colour, change in brightness, and the like) by the processor. Beneficially, the removal of background of the captured video provides a focus on facial look of the corresponding user.

At step 138C, the method 100 includes merging a video cut-out of each user of the plurality of users devoid of their background with a corresponding virtual character in the 3D virtual environment. After the removal of the background of the captured video, only the facial look and/or the full torso of the user is left in the video stream and is inserted into the virtual environment. Further, in an implementation, the video stream may be pasted on the virtual character of the corresponding user so that a face of the corresponding virtual character is represented as the face of the corresponding user. Thus, the virtual character's appearance is that of the user whose video cut-out has been inserted into the virtual environment, giving the impression that the user is actually present in the virtual environment to contribute to a sense of virtual presence.

At step 140, the method 100 includes, broadcasting metadata indicative of position coordinates of each virtual camera whose corresponding virtual character moves along the at least one predefined navigation path from a user device associated with a user of said virtual character to at least one other user device amongst the plurality of user devices. For example, the metadata of the first virtual character corresponding to the first user is broadcasted (e.g., via web sockets) to a second user device corresponding to the second user. Further, the broadcast of the metadata enables the second user to search and reach to the first virtual character of the first user in the 3D virtual environment. By receiving the metadata, the second user tracks the coordinates of the first virtual character and moves the second virtual character to reach the first virtual character.

At step 142, the method 100 includes, sending the plurality of video streams to the plurality of user devices for display thereat. In an implementation, the plurality of video streams captured by the plurality of virtual cameras may be sent either to the selective users from the plurality of users or each of the plurality of users.

The method 100 provides an enhanced user experience in the 3D virtual environment. The method 100 provides an improved navigation assistance for accessing the 3D virtual environment in such a way that each of the plurality of users does not miss specific details provided in the 3D virtual environment. The predefined navigation path disclosed in the method 100 points out to the at least one virtual area of the 3D virtual environment. Further, the predefined navigation path is divided into the plurality of sub-paths to assist the plurality of users in exploring the at least one virtual area from different directions. Moreover, the formation of the geometry of different shapes by different virtual positions of the plurality of virtual characters provides interactive cinematic experiences and cutscenes usually not available in video games or 3D videoconferencing platforms.

The steps 102 to 142 are only illustrative, and other alternatives can also be provided where one or more steps are added, one or more steps are removed, or one or more steps are provided in a different sequence without departing from the scope of the claims herein.

Figure 2:
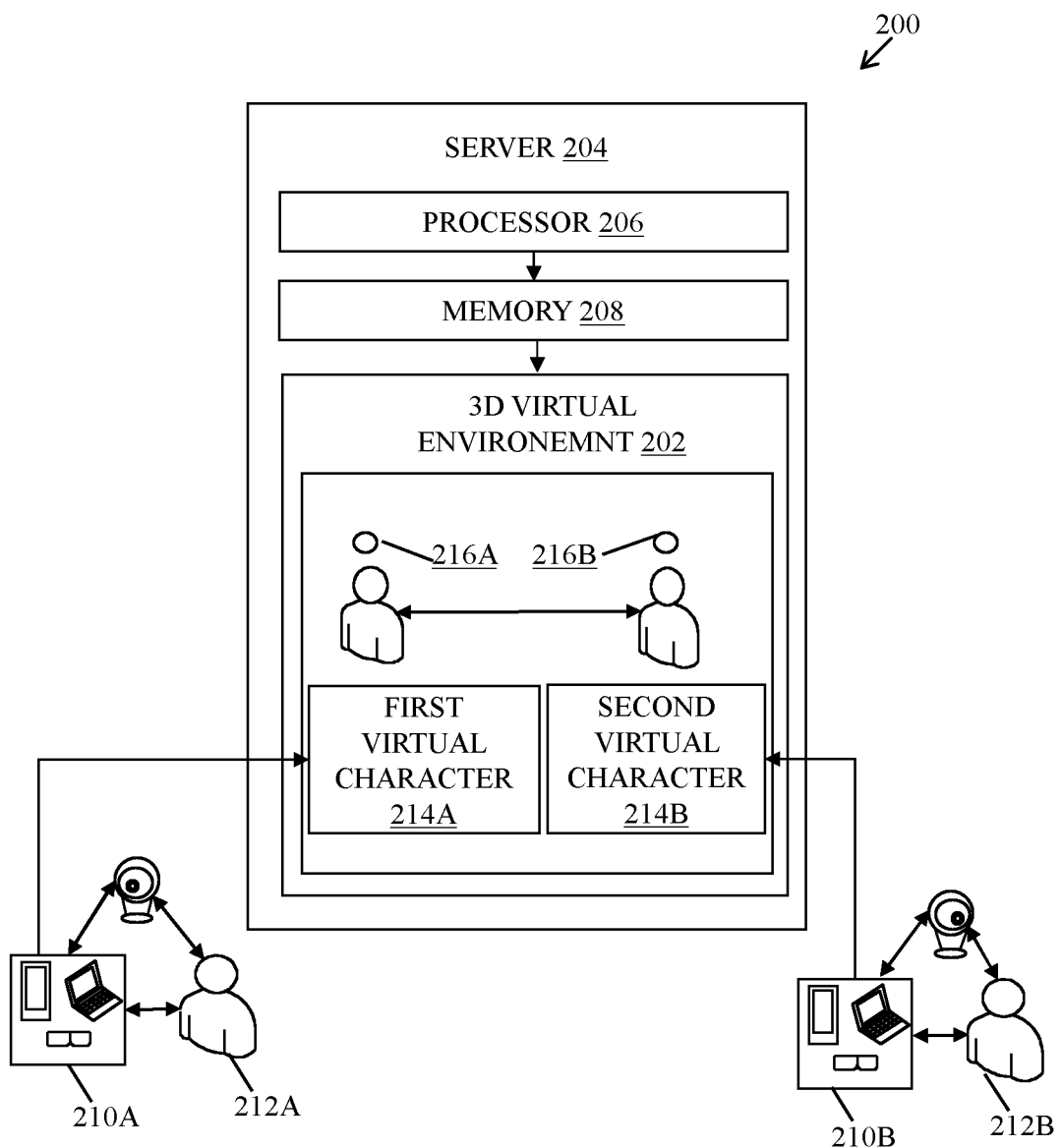
FIG. 2 illustrates a system for providing navigation assistance in a 3D virtual environment, in accordance with an embodiment of the present disclosure.

FIG. 2 illustrates a system for providing navigation assistance in a 3D virtual environment, in accordance with an embodiment of the present disclosure. FIG. 2 is described in conjunction with elements from FIG. 1. With reference to FIG. 2, there is shown a system 200 to provide navigation assistance in a 3D virtual environment 202. Further, the system 200 includes a server 204 for accessing the 3D virtual environment 202. The server 204 includes a processor 206 and a memory 208. There is further shown a plurality of user devices, such as a first user device 210A and a second user device 210B, operated by a plurality of users, such as a first user 212A and a second user 212B, respectively. Furthermore, there is shown a plurality of virtual characters, such as a first virtual character 214A and a second virtual character 214B, where each virtual character is associated with one of the plurality of users, such as the first virtual character 214A is associated with the first user 212A and the second virtual character 214B is associated with the second user 212B, respectively. The plurality of virtual characters, such as the first virtual character 214A and the second virtual character 214B have a plurality of virtual cameras, such as a first virtual camera 216A and a second virtual camera 216B. The system 200 is configured to execute the method 100 (of FIGS. 1A to 1E).

The 3D virtual environment 202 refers to a virtually construct (e.g., a virtual model) designed through any suitable 3D modelling technique and computer assisted drawings (CAD) methods that enables exploration thereof and communications between users through their corresponding virtual characters. Thus, the 3D virtual environment 202 may be a virtual meeting platform or videoconferencing platform having a virtual setting where users may walk around, see each other's virtual character, and communicate with each other. Examples of the 3D virtual environment 202 may include, but are not limited to, a 3D roller coaster, a 3D haunted house in an entertainment park, an entertainment park, video games a 3D museum, a 3D city, school, factory, or any venue, and the like.

The server 204 may include suitable logic, circuitry, interfaces, and/or code that is communicably coupled to the plurality of user devices, such as the first user device 210A and the second user device 210B. Alternatively stated, the server 204 is configured to provide access of the 3D virtual environment 202 to the plurality of users, such as first user 212A and the second user 212B using the plurality of user devices, such as the first user device 210A and the second user device 210B, respectively. The server 204 may be further configured to provide a live feed of the actions performed by the plurality of users, such as the first user 212A and the second user 212B in the 3D virtual environment 202. Examples of implementation of the server 204 may include, but are not limited to, a storage server, a cloud-based server, a web server, an application server, or a combination thereof.

The processor 206 may include suitable logic, circuitry, interfaces, or code that is configured to execute the instructions stored in the memory 208 of the server 204 in order to control the plurality of virtual characters, such as the first virtual character 214A and the second virtual character 214B, according to the commands provided by the plurality of users, such as the first user 212A and the second user 212B in the 3D virtual environment 202. Examples of the processor 206 may include, but are not limited to, a processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 208 may include suitable logic, circuitry, and/or interfaces that is configured to store the data related to the 3D virtual environment 202 that includes but not limited to, virtual areas of the 3D virtual environment 202, position of the plurality of virtual characters, audios, videos, and the like. In an implementation, the memory 208 may be configured to store data and instructions executable by the plurality of users, such as the first user 212A and the second user 212B. Examples of implementation of the memory 208 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

Each of the plurality of user devices, such as the first user device 210A and the second user device 210B may include suitable logic, circuitry, interfaces and/or code that is configured to communicably coupled to the server 204 in order to make the 3D virtual environment 202 accessible to the plurality of users, such as the first user 212A and the second user 212B, respectively. Examples of each of the plurality of user devices may include, but are not limited to, an Internet-of-Things (IoT) device, a smart phone, a machine type communication (MTC) device, a computing device, an IoT controller, a drone, a customized hardware for wireless telecommunication, a transmitter, or any other portable or non-portable electronic device.

Each of the plurality of virtual characters is controlled by each of the plurality of users in order to explore the 3D virtual environment 202. For example, the first virtual character 214A is controlled by the first user 212A and similarly, the second virtual character 214B is controlled by the second user 212B.

Each of the plurality of virtual cameras, such as the first virtual camera 216A and the second virtual camera 216B is used to capture different views in the 3D virtual environment 202 as each of the plurality of virtual characters, such as the first virtual character 214A and the second virtual character 214B moves in the 3D virtual environment 202 and thereafter, the captured views are represented on the plurality of user devices, such as the first user device 210A and the second user device 210B, respectively.

There is provided the system 200 for navigation assistance in the 3D virtual environment 202. The navigation assistance in the 3D virtual environment 202 means one or more particular directions are provided to the plurality of users, such as the first user 212A and the second user 212B in moving towards a point of interest in the 3D virtual environment 202. In an implementation, the system 200 may have N number of users and therefore, N number of user devices, N number of virtual characters and N number of virtual cameras but for sake of simplicity, only two users and therefore, two user devices, two virtual characters and two virtual cameras, are shown in FIG. 2.

The system 200 includes the plurality of user devices that are associated with the plurality of users and at least one server such as the server 204 communicably coupled to the plurality of user devices. In an implementation, the plurality of user devices, such as the first user device 210A is associated with the first user 212A. Similarly, the second user device 210B is associated with the second user 212B. The system 200 further includes the server 204 that is communicably coupled to each of the first user device 210A and the second user device 210B in order to make the 3D virtual environment 202 accessible to each of the first user 212A and the second user 212B.

The at least one server such as the server 204 is configured to provide, to the plurality of user devices, access to the 3D virtual environment. Each of the plurality of user devices accesses the 3D virtual environment 202 through the at least one server such as the server 204. For example, the first user 212A connects the first user device 210A to the at least one server such as the server 204 in order to access the 3D virtual environment 202. Similarly, the second user 212B connects the second user device 210B to the at least one server such as the server 204 in order to access the 3D virtual environment 202.

The 3D virtual environment 202 comprises the plurality of virtual characters corresponding to the plurality of users, where the plurality of virtual characters are arranged at different virtual positions that change dynamically as the plurality of virtual characters navigate through the 3D virtual environment 202, where the plurality of virtual characters communicate with each other in the 3D virtual environment 202. In an implementation, the first user 212A moves the corresponding first virtual character 214A in the 3D virtual environment 202 and the second user 212B moves the corresponding second virtual character 214B in the 3D virtual environment 202. The virtual positions of each of the first virtual character 214A and the second virtual character 214B change dynamically in order to provide different views of all virtual areas of the 3D virtual environment 202 to the plurality of users. The communication between each of the plurality of virtual characters has been described in detail, for example, in FIGS. 1A to 1E.

The 3D virtual environment 202 further comprises the plurality of virtual cameras corresponding to the plurality of virtual characters, where a given virtual camera is positioned at a given distance from a corresponding virtual character and views the 3D virtual environment 202 from a given orientation, where the given virtual camera is movable according to a movement of the corresponding virtual character. In an example, if the first user 212A moves the first virtual character 214A from one position to another position then, the corresponding first virtual camera 216A moves according to the movement of the first virtual character 214A. In another example, if the second user 212B moves the second virtual character 214B from one position to another position, then the corresponding second virtual camera 216B moves according to the movement of the second virtual character 214B. Beneficially, the movement of the plurality of virtual cameras in accordance with the movement of the plurality of virtual characters provides a holistic view of the virtual area of the 3D virtual environment 202 in which the corresponding virtual character is present.

The at least one server such as the server 204 is further configured to provide at least one predefined navigation path in the 3D virtual environment 202 for directing the plurality of virtual characters to move towards at least one virtual area in the 3D virtual environment 202. In an example, the first user 212A operates the first user device 210A to move the first virtual character 214A on the at least one predefined navigation path towards the at least one virtual area in the 3D virtual environment 202. In another example, the second user 212B operates the second user device 210B to move the second virtual character 214B on the at least one predefined navigation path towards the least one virtual area in the 3D virtual environment 202. Further, the at least one predefined navigation path is divided into the plurality of sub-paths so that each of the plurality of users explores and experiences the at least one virtual area from many directions. In an implementation, the at least one predefined navigation path is divided into a plurality of sub-paths at the at least one virtual area. Moreover, the at least one predefined navigation path is divided into the plurality of sub-paths that enables the plurality of users to experience a holistic view of the one or more virtual areas from different directions. Moreover, the plurality of sub-paths may have different patterns.

The at least one server such as the server 204 is further configured to provide an indication of scene details in the at least one virtual area when at least one of the plurality of virtual characters are present at or in proximity of the at least one virtual area. In an implementation, if the first user 212A moves the corresponding first virtual character 214A to enter in the proximity of the at least one virtual area, then the indication of the scene detail is provided to the first virtual character 214A either by highlighting of the particular virtual area, or by playing an audio, or a video in the particular virtual area and the like. The indication of scene details in the at least one virtual area is provided to the first virtual character 214A so that the first user 212A observes the particular details of the scene and does not miss them.

The at least one server such as the server 204 is further configured to capture a plurality of video streams using the plurality of virtual cameras, a given video stream is captured from a perspective of a given virtual camera that is associated with a given virtual character, where the given video stream represents at least a portion of the given virtual character and a region of the 3D virtual environment 202 whereat the given virtual character is present. For example, the first virtual camera 216A associated with the first virtual character 214A captures a video stream. The captured video stream includes different views of the particular virtual area in which the first virtual character 214A is present. Furthermore, the captured video stream includes a portion of the corresponding first virtual character 214A. Moreover, the video stream captured by the first virtual camera 216A is displayed on the first user device 210A to provide different views of the 3D virtual environment 202 to the first user 212A.

The at least one server such as the server 204 is further configured to send the plurality of video streams to the plurality of user devices for display thereat. In an example, the video stream captured by the first virtual camera 216A is displayed on the first user device 210A. In another example, the video stream captured by the second virtual camera 216B is displayed on the second user device 210B. The display of captured video streams on the plurality of user devices provides a third eye view of the at least one virtual area to the plurality of users.

In accordance with an embodiment, the at least one server such as the server 204 comprises at least one processor such as the processor 206 and at least one memory such as the memory 208 that are communicably coupled to each other, the at least one processor such as the processor 206 is configured to implement a virtual environment platform that hosts at least one 3D virtual environment 202, and the at least one memory such as the memory 208 is configured to store information and/or data pertaining to the at least one 3D virtual environment 202. In an implementation, the processor 206 of the server 204 executes the tasks in the 3D virtual environment 202. Further, the at least one memory such as the memory 208 of the server 204 provides storage to store the data related to the 3D virtual environment 202.

In an aspect, a computer program product for providing navigation assistance in a three-dimensional (3D) virtual environment 202, the computer program product comprising a non-transitory machine-readable data storage medium having stored thereon program instructions that, when accessed by a processing device. In an implementation, the computer program product includes the set of instruction and commands required to be executed with respect to the input provided by the plurality of users. For example, if the first user 212A commands to move the first virtual character 214A, then the computer program product executes the command after the analysis of the instructions with respect to the command to move the first virtual character 214A. Beneficially, the computer program product provides hassle free functioning of the 3D virtual environment 202. In an example, the instructions are implemented on the computer-readable media, which include, but is not limited to, Electrically Erasable Programmable Read-Only Memory (EEPROM), Random Access Memory (RAM), Read-Only Memory (ROM), Hard Disk Drive (HDD), Flash memory, a Secure Digital (SD) card, Solid-State Drive (SSD), a computer-readable storage medium, and/or CPU cache memory. The non-transitory computer-readable medium causes the computer to execute operations includes movement of the plurality of virtual characters upon receiving the command from the plurality of user devices, indication of objects when one of the plurality of virtual characters enters in the proximity of the at least one virtual area. Further, the non-transitory computer-readable medium is configured for storing the data updated by any of the plurality of users and broadcasting the data to the particular user from the plurality of users who has subscribed to the at least one virtual area in which the data is uploaded. Further, the non-transitory computer-readable medium is configured for displaying the at least one virtual area viewed by the plurality of virtual characters to the corresponding plurality of virtual devices.

Figure 3A:
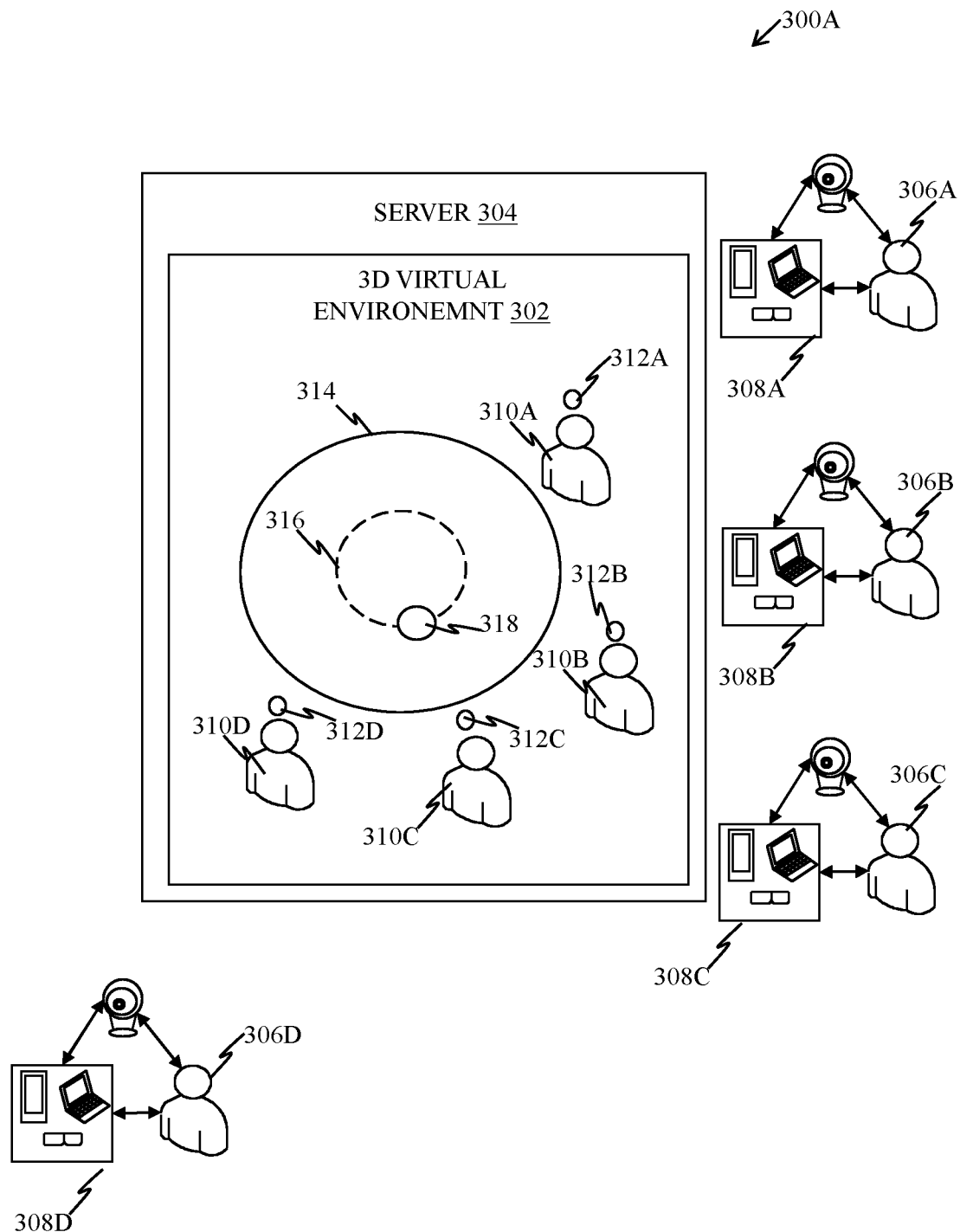
FIG. 3A illustrates an implementation scenario of a 3D virtual environment, in accordance with an embodiment of the present disclosure.

FIG. 3A illustrates an implementation scenario of a 3D virtual environment, in accordance with an embodiment of the present disclosure. FIG. 3A is described in conjunction with elements from FIG. 1 and FIG. 2. With reference to FIG. 3A, there is shown an implementation scenario 300A of a 3D virtual environment 302. There is further shown a server 304 to provide access of the 3D virtual environment 302 to a plurality of users, such as a first user 306A, a second user 306B, a third user 306C, and a fourth user 306D. Furthermore, the 3D virtual environment 302 includes at least one virtual area 314, a predefined navigation path 316, and a path camera 318.

The 3D virtual environment 302 shown in FIG. 3A corresponds to the 3D virtual environment 202 of FIG. 2. The server 304 shown in FIG. 3A corresponds to the server 204 of FIG. 2. Similarly, the plurality of users corresponds to the plurality of users in the FIG. 2 and the plurality of user devices corresponds to the plurality of user devices in the FIG. 2.

In the implementation scenario 300A, the at least one virtual area 314 of the 3D virtual environment 302 is considered as a virtual meeting room for video conferencing among the plurality of users, such as the first user 306A, the second user 306B, the third user 306C and the fourth user 306D. Each of the plurality of users is configured to access the at least one virtual area 314 (i.e., the virtual meeting room) using one of the plurality of user devices, such as the first user device 308A, the second user device 308B, the third user device 308C, and the fourth user device 308D. Thereafter, each of the plurality of virtual characters is controlled by one of the plurality of users through one of the plurality of user devices. For example, the first virtual character 310A is required to move on the predefined navigation path 316 by the first user 306A using the first user device 308A in order to reach or lie in the proximity of the at least one virtual area 314 (i.e., the virtual meeting room). Similarly, each of the second virtual character 310B, the third virtual character 310C and the fourth virtual character 310D is required to move on the predefined navigation path 316 by the second user 306B, the third user 306C and the fourth user 306D, respectively, using the second user device 308B, the third user device 308C and the fourth user device 308D, respectively, in order to reach or lie in the proximity of the at least one virtual area 314 (i.e., the virtual meeting room). When one of the plurality of virtual characters is present at or in proximity of the at least one virtual area 314 (i.e., the virtual meeting room) then, an indication of a point of interest is provided to the virtual character approaching towards the at least one virtual area 314 (i.e., the virtual meeting room). For example, if the first virtual character 310A enters in the proximity of the at least one virtual area 314 (i.e., the virtual meeting room), then the at least one virtual area 314 (i.e., the virtual meeting room) starts blinking or highlighted to grab the attention of the first user 306A that corresponds to the first virtual character 310A. Moreover, each of the plurality of virtual cameras is configured to capture a video stream of each of the plurality of virtual characters. For example, the first virtual camera 312A associated with the first virtual character 310A is configured to capture the video stream of movement of the first virtual character 310A towards the at least one virtual area 314 (i.e., the virtual meeting room) of the 3D virtual environment 302. Similarly, the second virtual camera 312B, the third virtual camera 312C and the fourth virtual camera 312D associated with the second virtual character 310B, the third virtual character 310C, and the fourth virtual character 310D, respectively, is configured to capture the video stream of movement of the second virtual character 310B, the third virtual character 310C, and the fourth virtual character 310D, respectively, towards the at least one virtual area 314 (i.e., the virtual meeting room) of the 3D virtual environment 302. The captured video stream is displayed on the corresponding user device. For example, the video stream of the first virtual character 310A captured by the first virtual camera 312A is displayed on the first user device 308A.

Furthermore, there is shown the path camera 318 provided along with the predefined navigation path 316. Although the predefined navigation path 316 shown in FIG. 3A is in the shape of a circle, any other suitable shape (described in detail, for example, in FIG. 3B) may be used so that the predefined navigation path 316 takes a virtual character of a user from one location to another within the at least one virtual area 314 of the 3D virtual environment 302. For example, the predefined navigation path 316 can be a straight line that crosses a virtual room from one end to another, or can be a squared, oval or rectangular path that goes around the room to provide users with a predefined experience of the virtual environment that still gives them freedom to look around (e.g., by rotating the path camera 318), zoom in or out, tilt, etc., interact with elements in the camera path, and even interact with other users (e.g., by speaking or texting other users or enabling them to share files). The path camera 318 is configured to capture the video streams in the 3D virtual environment 302. In some implementations, the path camera 318 is configured to perform a movement in the predefined navigation path 316 while maintaining a constant distance and constant viewing angle in the at least one virtual area 314 (i.e., the virtual meeting room). The path camera 318 may be accessed by any user through their corresponding virtual characters using the user devices, providing the user with a view from the path camera 318. As the path camera 318 moves, or a point of view is adjusted, such as by tilting or rotating the path camera 318 to change the viewing angle, the perspective is updated in the 3D virtual environment 302. Alternatively stated, the path camera 318 provides a third person view.

For example, if the first user 306A requires to view the second virtual character 310B corresponding to the second user 306B but the third virtual character 310C blocks the site of view of the first user 306A, then the path camera 318 provides view of the second virtual character 310B by changing its position and orientation so that the first user 306A does not require to change the position of the corresponding first virtual character 310A. Beneficially, the path camera 318 provides the multiple viewing angles without changing the position of the plurality of virtual characters. Each of the plurality of virtual cameras is different from the path camera 318, as each of the plurality of virtual cameras provide a line-of-sight view of the corresponding virtual character whereas the path camera 318 provides the third eye view to the plurality of users. For example, if the first virtual character 310A is positioned in front of the second virtual character 310B, then the first user 306A may only see the second virtual character 310B. The reason being, the second virtual character 310B is in the line-of-sight of the first virtual camera 312A. Further, the first user 306A may view other directions without moving the first virtual character 310A by using the path camera 318.

Figure 3B:
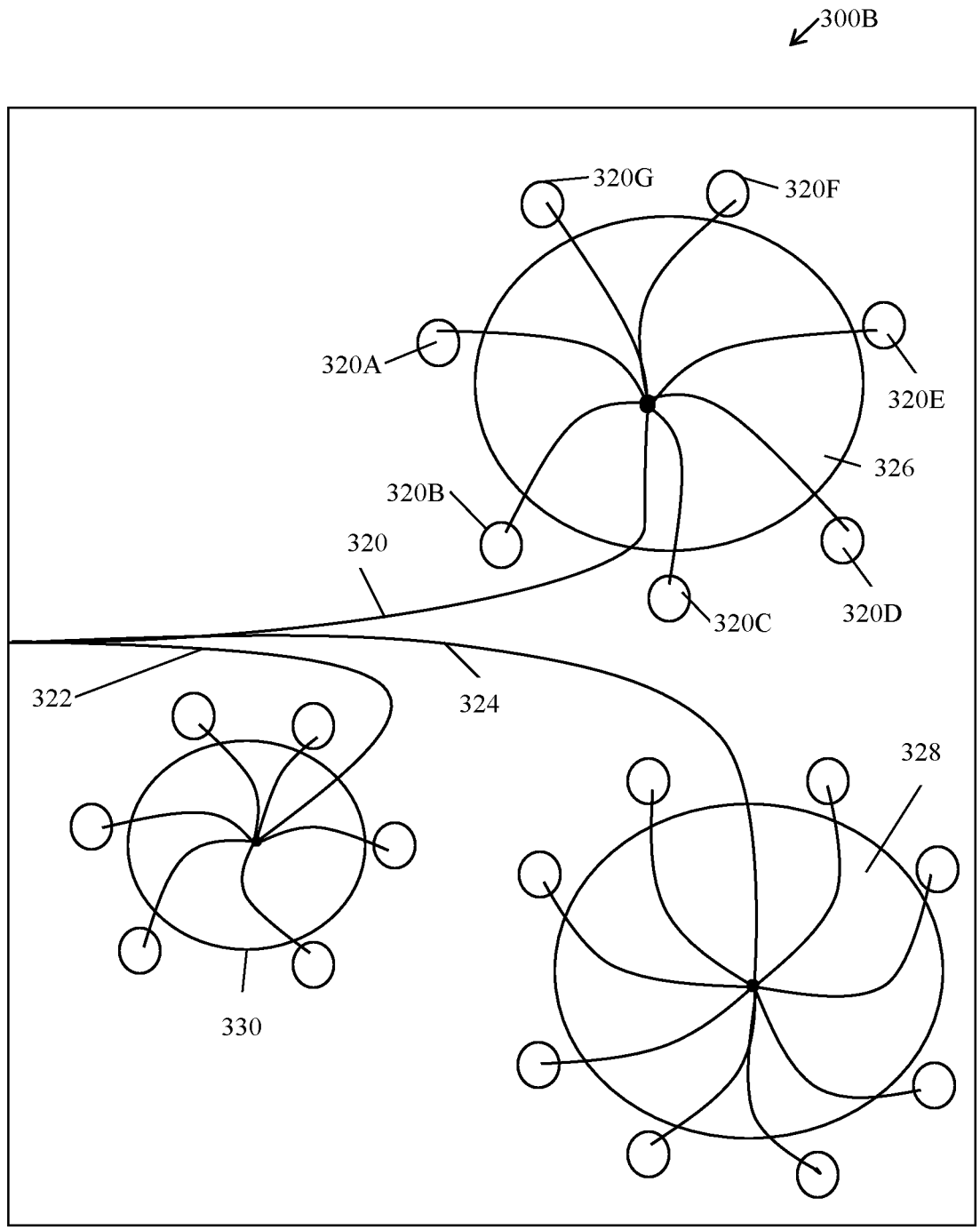
FIG. 3B illustrates an implementation scenario of a predetermined navigation path in a 3D virtual environment, in accordance with an embodiment of the present disclosure.

FIG. 3B illustrates an implementation scenario of predetermined navigation path in a 3D virtual environment, in accordance with an embodiment of the present disclosure. FIG. 3B is described in conjunction with elements from FIGS. 1A to 1E, FIG. 2, and FIG. 3A.

With reference to FIG. 3B, there is shown an implementation scenario 300B of a predetermined navigation path in the 3D virtual environment 302.

In an implementation, the predefined navigation path 316 branches out into a plurality of sub-paths starting from a common path and the plurality of sub-paths branch out spiralling down to the seats of the plurality of users in the 3D virtual environment 302. For example, a first predefined navigation path 320 branches out into a plurality of sub paths, such as a first sub path 320A, a second sub path 320B, a third sub path 320C, a fourth sub path 320D, a fifth sub path 320E, a sixth sub path 320F, and a seventh sub path 320G that are spiralling down to the seats of the plurality of users around a table 326 within the 3D virtual environment 302. Similarly, a second predefined navigation path 322 and a third predefined navigation path 324 also branch out into a plurality of sub-paths around the table 328 and the table 330, respectively, as shown in FIG. 3B. Similarly, other possible number of predefined navigation paths and sub-paths can be branched out without limiting the scope of the disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A method for providing navigation assistance in a three-dimensional (3D) virtual environment, the method comprising:
   accessing the 3D virtual environment using a plurality of user devices that are associated with a plurality of users,
   wherein the 3D virtual environment comprises
      a plurality of virtual characters corresponding to the plurality of users, the plurality of virtual characters being arranged at different virtual positions that change dynamically as the plurality of virtual characters navigate through the 3D virtual environment, wherein the plurality of virtual characters communicate with each other in the 3D virtual environment; and
      a plurality of virtual cameras corresponding to the plurality of virtual characters, wherein a given virtual camera is positioned at a given distance from a corresponding virtual character and views the 3D virtual environment from a given orientation, the given virtual camera being movable according to a movement of the corresponding virtual character;
   providing at least one predefined navigation path in the 3D virtual environment for directing the plurality of virtual characters to move towards at least one virtual area in the 3D virtual environment;
   providing an indication of scene details in the at least one virtual area when at least one of the plurality of virtual characters are present at or in proximity of the at least one virtual area;
   capturing a plurality of video streams using the plurality of virtual cameras, a given video stream being captured from a perspective of a given virtual camera that is associated with a given virtual character, wherein the given video stream represents at least a region of the 3D virtual environment whereat the given virtual character is present; and
   sending the plurality of video streams to the plurality of user devices for display thereat,
   wherein the at least one predefined navigation path is divided into a plurality of sub-paths at the at least one virtual area, and the at least one predefined navigation path comprises a series of segments, a given segment being one of: a linear segment or a curved segment.

2. The method according to claim 1, wherein the at least one predefined navigation path includes a 3D spline.

3. The method according to claim 1, wherein the plurality of sub-paths are in the form of at least one of: a spiral pattern, or a linear pattern.

4. The method according to claim 1, wherein the indication of the scene details is in the form of at least one of: a visual indication, an audio indication, or a haptic indication.

5. The method according to claim 1, wherein the given video stream also represents a portion of the given virtual character.

6. The method according to claim 1, wherein the given virtual camera is positioned above the corresponding virtual character.

7. The method according to claim 1, wherein at any given time, the different virtual positions of the plurality of virtual characters form a geometry, wherein the geometry is one of: a circular geometry, an oval geometry, a polygonal geometry, a linear geometry, an arcuate geometry, or a curvilinear geometry.

8. The method according to claim 1, further comprising:
   publishing data associated with a given character amongst the plurality of virtual characters to a given area of the 3D virtual environment; and
   broadcasting the data to at least one user device whose user has subscribed to the given area of the 3D virtual environment.

9. The method according to claim 8, wherein the data comprises at least one of: a position, an orientation, an audio, or a video, associated with the given character.

10. The method according to claim 1, further comprising controlling the given virtual camera using at least one user device from amongst the plurality of user devices.

11. The method according to claim 1, further comprising providing a visual indication of a position of at least one virtual camera whose corresponding virtual character moves along the at least one predefined navigation path.

12. The method according to claim 1, further comprising:
   receiving, at a user device, at least two video streams from at least two other user devices amongst the plurality of user devices;
   organizing the at least two video streams into a main stream and at least one peripheral stream, based on relative virtual positions of virtual characters corresponding to the at least two video streams with respect to a virtual position of a virtual character corresponding to a user of the user device and a view direction of a virtual camera corresponding to the virtual character, wherein the virtual characters correspond to at least two users of the at least two other user devices; and providing, at the user device, the main stream and the at least one peripheral stream at varying video qualities for displaying, wherein a video quality of the main stream is higher than a video quality of the at least one peripheral stream.

13. The method according to claim 12, wherein the step of organizing the at least two video streams comprises determining a video stream to be a peripheral stream when:
   a virtual position of a virtual character corresponding to the video stream lies at a distance that is greater than a predefined threshold distance from the virtual position of the virtual character corresponding to the user of the user device; and/or
   a position of a virtual character corresponding to the video stream lies at an angle that is greater than a predefined threshold angle from the view direction of the virtual camera corresponding to the virtual character.

14. The method according to claim 1, further comprising broadcasting metadata indicative of position coordinates of each virtual camera whose corresponding virtual character moves along the at least one predefined navigation path from a user device associated with a user of said corresponding virtual character to at least one other user device amongst the plurality of user devices.

15. The method according to claim 1, further comprising triggering at least one action when any of the plurality of virtual characters enter the at least one virtual area through the at least one predefined navigation path, wherein the at least one predefined navigation path includes at least one trigger point at which if any of the plurality of virtual characters is present, the at least one action is triggered.

16. The method according to claim 15, wherein the at least one action comprises at least one of: sending a video, playing an audio, or activating an object placed in the at least one predefined navigation path.

17. The method according to any claim 1, further comprising:
   capturing a plurality of video feeds using cameras of the plurality of user devices, the plurality of video feeds representing the plurality of users;
   removing a background of each user of the plurality of users from a corresponding video feed; and
   merging a video cut-out of each user of the plurality of users devoid of their background with a corresponding virtual character in the 3D virtual environment.

18. A system for providing navigation assistance in a three-dimensional (3D) virtual environment, the system comprising:
   a plurality of user devices that are associated with a plurality of users; and at least one server communicably coupled to the plurality of user devices, wherein the at least one server is configured to:
   provide, to the plurality of user devices, access to the 3D virtual environment, wherein the 3D virtual environment comprises
      a plurality of virtual characters corresponding to the plurality of users, the plurality of virtual characters being arranged at different virtual positions that change dynamically as the plurality of virtual characters navigate through the 3D virtual environment, wherein the plurality of virtual characters communicate with each other in the 3D virtual environment; and
      a plurality of virtual cameras corresponding to the plurality of virtual characters, wherein a given virtual camera is positioned at a given distance from a corresponding virtual character and views the 3D virtual environment from a given orientation, the given virtual camera being movable according to a movement of the corresponding virtual character;
   provide at least one predefined navigation path in the 3D virtual environment for directing the plurality of virtual characters to move towards at least one virtual area in the 3D virtual environment;
   provide an indication of scene details in the at least one virtual area when at least one of the plurality of virtual characters are present at or in proximity of the at least one virtual area;
   capture a plurality of video streams using the plurality of virtual cameras, a given video stream being captured from a perspective of a given virtual camera that is associated with a given virtual character, wherein the given video stream represents at least a portion of the given virtual character and a region of the 3D virtual environment whereat the given virtual character is present; and
   send the plurality of video streams to the plurality of user devices for display thereat;
   wherein the at least one predefined navigation path is divided into a plurality of sub-paths at the at least one virtual area, and the at least one predefined navigation path comprises a series of segments, a given segment being one of: a linear segment or a curved segment.

19. The system according to claim 18, wherein the at least one server comprises at least one processor and at least one memory that are communicably coupled to each other, wherein the at least one processor is configured to implement a virtual environment platform that hosts at least one 3D virtual environment, and the at least one memory is configured to store information and/or data pertaining to the at least one 3D virtual environment.

20. A computer program product for providing navigation assistance in a three-dimensional (3D) virtual environment, the computer program product comprising a non-transitory machine-readable data storage medium having stored thereon program instructions that, when accessed by a processing device, cause the processing device to execute steps of the method of claim 1.

* * * * *